(12) United States Patent
Raichelgauz et al.

(10) Patent No.: US 8,112,376 B2
(45) Date of Patent: Feb. 7, 2012

(54) SIGNATURE BASED SYSTEM AND METHODS FOR GENERATION OF PERSONALIZED MULTIMEDIA CHANNELS

(75) Inventors: Igal Raichelgauz, Herzelia (IL); Karina Odinaev, Haifa (IL); Yehoshua Y Zeevi, Haifa (IL)

(73) Assignee: Cortica Ltd., Tirat Carmel (IL)

( * ) Notice: Subject to any disclaimer, the term of this patent is extended or adjusted under 35 U.S.C. 154(b) by 261 days.

(21) Appl. No.: 12/434,221

(22) Filed: May 1, 2009

(65) Prior Publication Data

US 2009/0216761 A1 Aug. 27, 2009

Related U.S. Application Data

(63) Continuation-in-part of application No. 12/084,150, filed as application No. PCT/IL2006/001235 on Oct. 26, 2006, application No. 12/434,221, which is a continuation-in-part of application No. 12/195,863, filed on Aug. 21, 2008, which is a continuation-in-part of application No. 12/084,150.

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 17/30* (2006.01)
(52) U.S. Cl. ........................................................ 706/46
(58) Field of Classification Search .................... 706/10, 706/21, 46; 370/352
See application file for complete search history.

(56) References Cited

U.S. PATENT DOCUMENTS

| 6,243,375 | B1 * | 6/2001 | Speicher ........................ 370/352 |
| 6,611,628 | B1 | 8/2003 | Sekiguchi et al. |
| 6,665,657 | B1 | 12/2003 | Dibachi |
| 6,751,613 | B1 | 6/2004 | Lee et al. |
| 6,754,435 | B2 | 6/2004 | Kim |

(Continued)

FOREIGN PATENT DOCUMENTS

WO WO 02/31764 4/2002

(Continued)

OTHER PUBLICATIONS

Iwamoto, K.; Kasutani, E.; Yamada, A.;, "Image Signature Robust to Caption Superimposition for Video Sequence Identification," Image Processing, 2006 IEEE International Conference on , vol., No., pp. 3185-3188, Oct. 8-11, 2006 doi: 10.1109/ICIP.2006.313046 URL: http://ieeexplore.ieee.org/stamp/stamp.jsp?tp=&arnumber=4107247&isnumber=4106440.*

(Continued)

*Primary Examiner* — Jeffrey A Gaffin
*Assistant Examiner* — Ola Olude-Afolabi
(74) *Attorney, Agent, or Firm* — Myers Wolin, LLC

(57) ABSTRACT

A system for generating personalized channels of multimedia content. The system comprises an interface to one or more multimedia sources, wherein the multimedia sources provide multimedia content to the personalized channels of multimedia content; and a server for receiving multimedia content from the one or more multimedia sources through the interface and for serving selected multimedia content to users of the system over one or more of the personalized channels; wherein a user of the system receives personalized multimedia content gathered by the server into the one or more of the personalized channels responsive of preferences of the user as observed by the system for the user.

13 Claims, 4 Drawing Sheets

U.S. PATENT DOCUMENTS

| | | | |
|---|---|---|---|
| 6,819,797 | B1 | 11/2004 | Smith et al. |
| 6,901,207 | B1 | 5/2005 | Watkins |
| 7,013,051 | B2 | 3/2006 | Sekiguchi et al. |
| 7,020,654 | B1 | 3/2006 | Najmi |
| 7,260,564 | B1 | 8/2007 | Lynn et al. |
| 7,302,117 | B2 | 11/2007 | Sekiguchi et al. |
| 7,313,805 | B1 | 12/2007 | Rosin et al. |
| 7,340,458 | B2 | 3/2008 | Vaithilingam et al. |
| 7,353,224 | B2 | 4/2008 | Chen et al. |
| 7,376,672 | B2 | 5/2008 | Weare |
| 7,433,895 | B2 | 10/2008 | Li et al. |
| 7,464,086 | B2 | 12/2008 | Black et al. |
| 2004/0153426 | A1 | 8/2004 | Nugent |
| 2005/0177372 | A1 | 8/2005 | Wang et al. |
| 2006/0236343 | A1 | 10/2006 | Chang |
| 2006/0253423 | A1 | 11/2006 | McLane et al. |
| 2007/0074147 | A1 | 3/2007 | Wold |
| 2007/0130159 | A1 | 6/2007 | Gulli et al. |
| 2007/0244902 | A1 | 10/2007 | Seide et al. |
| 2007/0253594 | A1 | 11/2007 | Lu et al. |
| 2008/0072256 | A1 | 3/2008 | Boicey et al. |
| 2008/0201314 | A1 | 8/2008 | Smith et al. |

FOREIGN PATENT DOCUMENTS

| | | | |
|---|---|---|---|
| WO | WO 2007/049282 | | 5/2007 |

OTHER PUBLICATIONS

Lin, C.; Chang, S.; "Generating Robust Digital Signature for Image/Video Authentication, "Multimedia and Security Workshop at ACM Multimedia '98. Bristol, U.K. Sep. 1998, pp. 49-54.*

Maass, W. et al.: "Computational Models for Generic Cortical Microcircuits", Institute for Theoretical Computer Science, Technische Universitaet Graz, Graz, Austria, published Jun. 10, 2003.

International Search Report for the related International Patent Application PCT/IL2006/001235; Date of Mailing: Nov. 2, 2008.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin/Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251 German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natschlager, T. et al.: "The "liquid computer": a novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for the related International Patent Application No. PCT/US2008/073852; Date of Mailing: Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; Date of Issuance: Jul. 28, 2009.

IPO Examination Report under Section 18(3) for corresponding UK application No: GB1001219.3, dated Sep. 12, 2011.

* cited by examiner

SIGNATURE BASED SYSTEM AND METHODS FOR GENERATION OF PERSONALIZED MULTIMEDIA CHANNELS

CROSS-REFERENCE TO RELATED PATENT APPLICATIONS

This patent application is a continuation in part of:
(a) U.S. patent application Ser. No. 12/084,150 filed on Apr. 25, 2008, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006; and
(b) U.S. patent application Ser. No. 12/195,863, filed Aug. 21, 2008, now pending, which claims priority under 35 USC 119 from Israeli Application No. 185414, filed on Aug. 21, 2007, and which is also a continuation-in-part of the above-referenced U.S. patent application Ser. No. 12/084,150. All of the applications referenced above are herein incorporated by reference.

TECHNICAL FIELD

The present invention relates generally to searching and categorizing multimedia data, and more specifically to systems, methods and apparatuses that enable the automatic personalization of multimedia content channels that suit a user implied preferences.

BACKGROUND OF THE INVENTION

In general, when searching for Web pages, typical Web search engines have the advantage of a database of textual information over which to search. Computers have been able to process textual information for decades. To find a Web page containing a specific word it is necessary to merely enter that word into a search engine search box and the search engine will attempt to find pages that contain the particular word.

When it comes to searching for images or other multimedia data, existing search algorithms, and their implementations generally rely on descriptive cataloging. An image has, at a minimum, a file name, and optionally text tags, otherwise referred to as metadata, which may be interpreted as a title, description, or keywords. A database of cataloged images can have additional information included and real cataloging. For example, the records could list the artist, the date of production, the style, the theme, the colors, the reproduction technique, etc. Yet cataloging the information content within images is a daunting task and in most cases incomplete or insufficient as visual content has a huge amount of useful data that may require tagging for searches, which is not practical to achieve.

The sound files, like images, may be indexed by their titles. Unfortunately, if it is simply an embedded or linked audio file on a Web page, there may be no additional information about it. The audio files may have some descriptive information included, such as the source. Other metadata can be included in audio files, but that requires more effort on the part of the content producer, and as in the case of images discussed above, this may be incomplete or insufficient, to say the least.

To fully index the content of audio files generally requires having a transcript of the session in a computer-readable text format to enable text-indexing. With voice recognition software, some automated indexing of audio files is possible and has been successfully used. However, it is widely known that such transcripts rarely match what was spoken exactly. The difficulty is compounded if the spoken words are sung and the search is for the song in a specific tune, or a search for a tune regardless of the words.

When combining the difficulties of searching for images with the difficulties of searching for audio files, one may begin to appreciate the exacerbated problems of searching for multimedia content such as video. Like audio, video comes in a variety of formats, filed or streamed, including AVI, MPEG, QuickTime®, Windows® Media, and Real®.

Video content is even more difficult to index because of the large amount of data that may require indexing, which includes images, or portions thereof, and text embedded in the image, as well as sounds. The amount of all kinds of multimedia content distributed via the Internet is growing rapidly, much of it being sparsely indexed, if at all. While general Web spiders can index file names of multimedia content, and possibly the anchor text that links to the files, they are unable to effectively index the actual content of the multimedia files and hence it is inaccessible to the search engine unless a transcript is available as well.

In view of the limitations of the prior art, it would be advantageous to provide a solution that enables automatic personalization of multimedia search. It would be further advantageous to enable the mapping of multimedia content to topics.

SUMMARY OF THE INVENTION

Certain embodiments of the invention include system for generating personalized channels of multimedia content. The system comprises an interface to one or more multimedia sources, wherein the multimedia sources provide multimedia content to the personalized channels of multimedia content; and a server for receiving multimedia content from the one or more multimedia sources through the interface and for serving selected multimedia content to users of the system over one or more of the personalized channels; wherein a user of the system receives personalized multimedia content gathered by the server into the one or more of the personalized channels responsive of preferences of the user as observed by the system for the user.

Certain embodiments of the invention further include method for generating personalized channels of multimedia content. The method comprises initializing one or more personalized multimedia content channels of a user with multimedia content; wherein the multimedia content in the one or more personalized multimedia content channel is presented to the user on at least a web-browser of a computing device; receiving preferences of the user regarding the preferred multimedia content in the personalized multimedia content channels; and changing the multimedia content in the one or more personalized multimedia content channels based on the received preferences.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
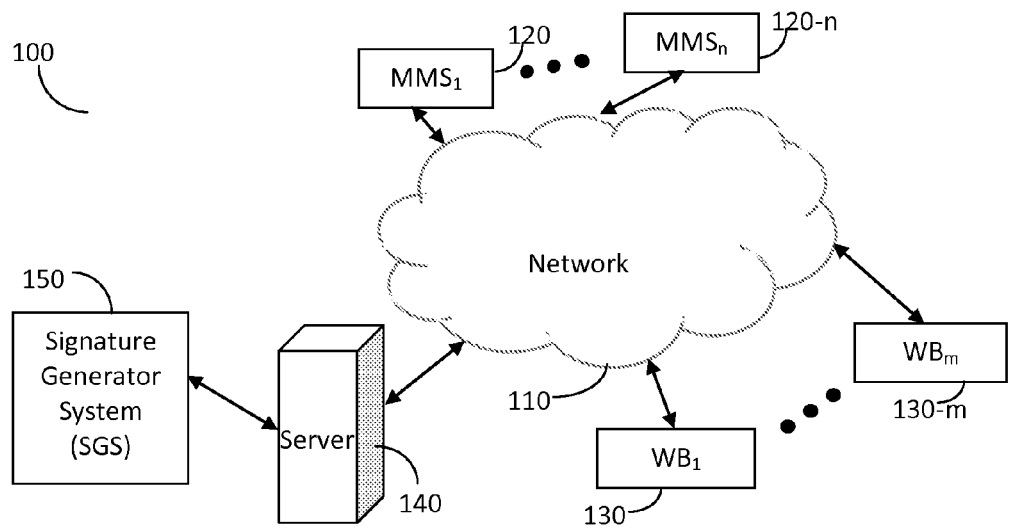
FIG. 1 is a schematic block diagram of a system for multimedia content channels personalized in accordance with an embodiment of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Non-limiting embodiments of the invention include system and method for producing of personalized audio-visual channels of multimedia content based on comparison of Signatures of the multimedia content. The user of a personalized channel receives a plurality of multimedia content based on an initial user preference, a default reference, or other initialization criteria. Subsequently, the user may refine the filtering of multimedia content provided by the system by removing undesired multimedia content, thereby automatically refining the user preferences for multimedia content, according to which future multimedia content will be provided by the system. The system searches continuously for additional multimedia content that is compatible with the preferred multimedia content selected by the user. Personalization of channels is based on Signatures, tags, or other elements associated with multimedia content. The multimedia content includes, but is not limited to, video, audio and graphics.

FIG. 1 shows an exemplary and non-limiting schematic diagram of a system 100 enabling the production of personalized multimedia channels realized in accordance with the principles of the invention. A network 110 is used to communicate between different parts of the system. The network 110 may be the Internet, the world-wide-web (WWW), local area network (LAN), wide area network (WAN), metro area network (MAN) and other networks capable of enabling communication between the elements of the system 100. To the network 110 there are coupled one or more multimedia sources (MMSs) 120-1 through 120-n (collectively referred hereinafter as MMSs 120 or individually as MMS 120, merely for simplicity purposes), each capable of providing multimedia content. Multimedia content includes, but is not limited to, images, graphics, video stream, video clips, audio streams, audio clips, video frames, photographs, images of signals (e.g., spectrograms, phasograms, scalograms, etc.), combination thereof and portions thereof. Further connected to the network 110 are one or more client applications, such as web browsers (WB) 130-1 through 130-m (collectively referred hereinafter as web browsers 130 or individually as web browser 130, merely for simplicity purposes). A web browser 130 is executed over a computing device including, for example, personal computers (PCs), personal digital assistants (PDAs), telephone, mobile phones, and other kinds of wired and mobile appliances, equipped with browsing, viewing, listening, filtering, and managing capabilities etc., enabled as further discussed herein below. Network 110 thereby provides an interface to the multimedia content available in MMSs 120.

A server 140 is further coupled to the network 110 and may provide to a web browser 130 web pages containing multimedia content, or references therein, such that upon request by a web browser such multimedia content is provided to the web browser 130. Furthermore, a signature generator system (SGS) 150 is further coupled to server 140. The server 140 is enabled to receive and serve multimedia content and cause the SGS 150 to generate a Signature, as explained in more detail herein below with respect to FIGS. 3 and 4, for all multimedia content. The multimedia content provided to a web browser 130 is dependent on comparison of Signatures as used by a user of the web browser 130 and will be apparent from the description of FIGS. 4 and 5.

In certain exemplary embodiments a web browser 130, or client channel manager application (not shown), available on either the server 140, on the web browser 130, or as an independent or plug-in application, may enable a user to create customized channels of multimedia content. Such customized channels of multimedia content are personalized content channels that are generated in response to selections made by a user of the web browser 130 or the manager application, the system 100, and in particular server 140 in conjunction with SPS 150, will determine which multimedia content is more suitable to be viewed, played or otherwise utilized by the user with respect to a given channel, based on the Signatures of selected multimedia content. These channels may optionally be shared with other users, used and/or further developed cooperatively, and/or sold to other users or providers, and so on.

In certain exemplary embodiments, a client, using for example a client channel manager application (not shown), may register as a user, either for free or for payment. The user may initially define one or more new channels, for example, a channel for video clips of classical music, or even more particularly, video clips of classical music with a particular conductor. The multimedia content is subsequently extracted from existing sources and distributed to the client as an initial content cluster or clusters. Clusters may be described as groupings of content elements that have some commonality that can then be shown, streamed or otherwise transmitted through a channel. The system may initially begin streaming a variety of multimedia content that relates generally to such a defined channel, such as a music channel.

When the user opens the client application and views the various multimedia content elements available on the channel, the user may accept, reject or leave pending the various multimedia content elements. The user may also grade the content and/or clusters in terms of quality, relevance, etc., as well as easily enter other data categories that define the cluster. In one embodiment of the invention the additional data category may be defined by another type of multimedia content, for example, an image or a clip of sorts. Furthermore, the user may decide to remove all single images, lyrics, interviews etc., and to accept only the video clips. The user's choices can then be filtered, reorganized, and further defined to provide to the server 140 a more focused channel for the user.

Subsequent to the user's modifications to the channel, the system 100 ceases sending clusters with pictures, lyrics, interviews, etc., presents only music video clips of focused content, based on the user's updated preferences and/or behavior, to the user. As such, the more the user is involved in responding to the presented multimedia content (e.g., by responding to the content by viewing it, deleting it from the cluster, approving it as desirable content, rejecting it as undesirable content, and/or by simply choosing preferred content or data etc.), the more the system 100, and particularly the server 140, learn how to improve the clusters being pushed to the web browser 130 for the user to view.

It should be appreciated that the system 100 may be adapted to learn on its own, by comparing external multimedia content to multimedia content that was found to be desirable to the user. In some embodiments each channel, which may be personalized by a client, may be stored, filtered and distributed, for example, using existing channels, such as YouTube®, Facebook®, and others.

Figure 2:
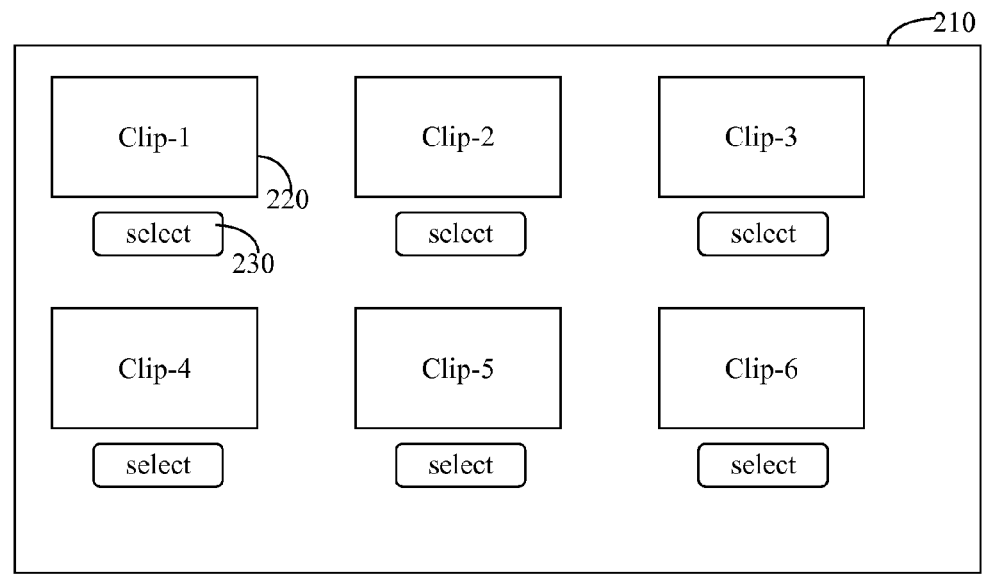
FIG. 2 is a schematic view of a web browser, displaying video clips for selection in accordance with an embodiment of the invention.

FIG. 2 shows an exemplary and non-limiting view of a web browser displaying video clips for selection. The view area 210 displays a plurality of images of video clips 220 (shown for example as clips 1 thorough 6). One frame or more may be shown as the image for each respective video clip in the view area 210, or a part thereof. A user can view a video clip associated with a clip 220 by, for example, directly clicking on-top of the image 220 displayed in view area 210. One of ordinary skill in the art would readily realize that other ways can also be used. A user can then press the "select" button 230, or the like thereof, to enter one or more selected clips (optionally those viewed) as one of interest to the user. Such a selection of a clip or file may add the selection to at least one of the user's clusters, to be transmitted to the user in one or more selected user channels. Similarly, another button may be marked "remove" and enable the removal of a video clip from the cluster of video clips selected for the user. All such information, as derived by user responses, choices or behavior, is transmitted back to the server 140 for the purpose of determination of future video clips to be pushed to the user of web browser 130. It should be understood that while the above example referred to video clips, other multimedia content would be equally suitable for such treatment.

Figure 3:
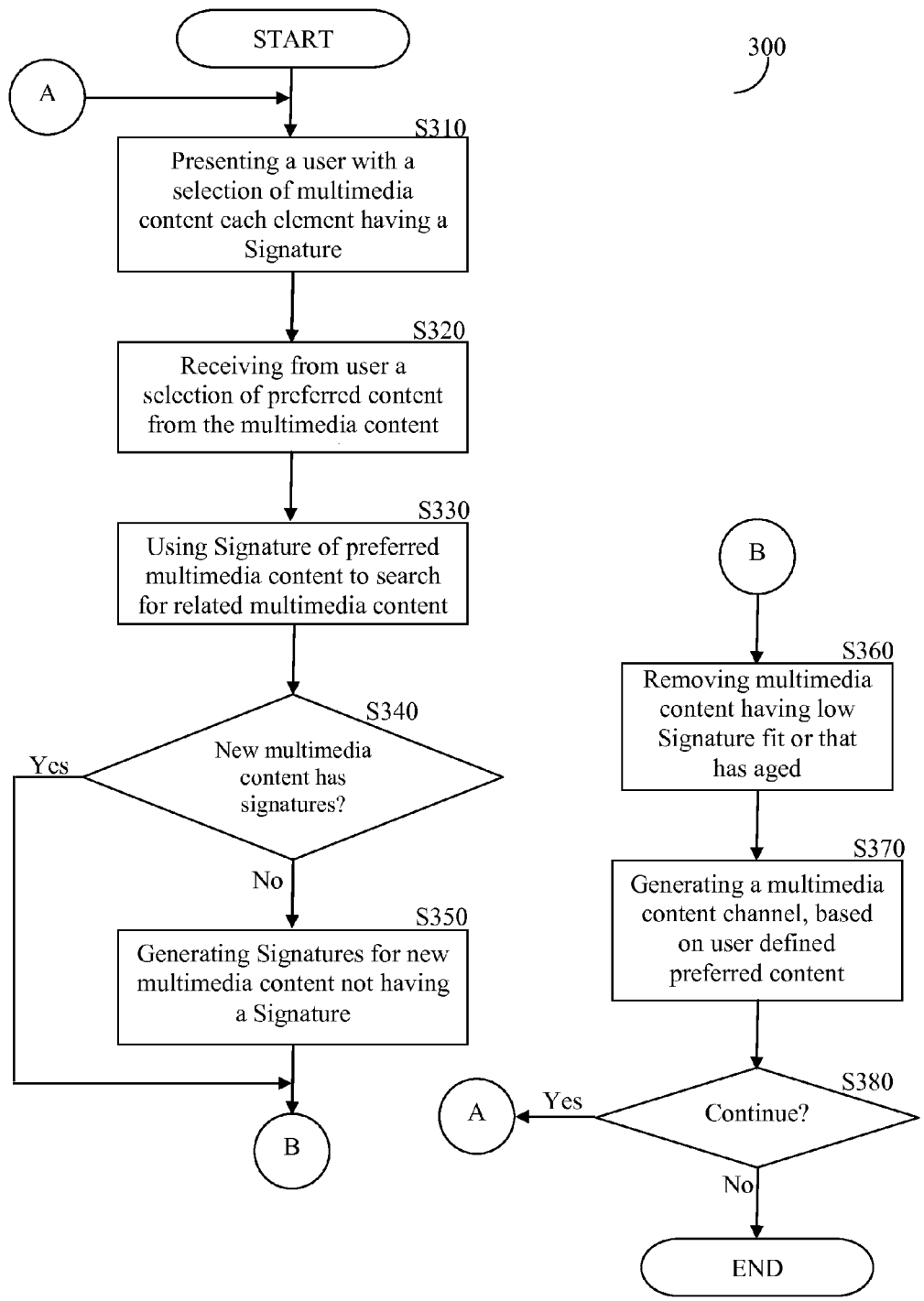
FIG. 3 is a flowchart that schematically illustrates some of the steps enabling the generation of desirable multimedia content in accordance with an embodiment of the invention.

FIG. 3 shows is an exemplary and non-limiting flowchart 300 that schematically illustrates the process enabling the generation of desirable multimedia content for a user of the system 100. For the purpose of this illustration it is assumed that initially a user makes a request to be provided with one or more categories of multimedia content. In S310 the user is presented with a selection of multimedia content, each of the multimedia content having a Signature, as described in more detail herein below with respect to FIGS. 4 and 5. In certain embodiments the system 100 is initialized with the initial user preferences, a default reference or other initialization criteria. Initial user preferences may be types of multimedia content that a user prefers to have access to and can be entered as a textual selection. A default reference may be provided by the system that comprises one or more clusters that potentially are of interest to a particular user. For example, clusters of Signatures for a particular user may be provided by the system as a default reference from which the processes disclosed herein begin. Other initialization criteria may also be used and are not a departure from the principles of the inventions disclosed herein.

In S320 the system 100, and in particular the server 140, receives from the user using the web browser 130 a selection of information respective of the presented or pushed multimedia content. Such selection information may include, but is not limited to, accepting the content, removing the content, preferring the content, ranking the content, defining the content, filtering the content, and the like. In S330, responsive, for example, to the preference of the user, more multimedia content that is found to match with the Signatures of the user preferred multimedia content, are searched for by the system. In S340, it is checked whether the new multimedia data has Signatures, and if not it continues with S350; otherwise, it continues with S360.

In S350 the new multimedia content not having a Signature or Signatures is associated with a respective Signature based on the matching process of S330, where Signatures were created for the purpose of matching, and then continues with S360. S340 and S350 may, in an embodiment of the invention be performed in parallel with, or integrated with, S330, i.e., when a new multimedia content to be matched does not already have a Signature, then a Signature in accordance with the principles of the invention is generated and associated with the new multimedia content.

In S360 multimedia content that was marked to be removed by the user, or has aged for lack of viewing or otherwise being ignored by the user of, for example, the web browser 130, is removed from the updated viewing list of multimedia content to be displayed to a user in, for example, viewing area 210. In S370, a multimedia content channel is generated, based on user defined preferred content. Such content may be pushed to a client application, in accordance with user preferences. In an exemplary embodiment of the invention a personalized content channel provided to the user includes multimedia content that comprises tags belonging to a cluster. A cluster may be created by, for example and without limitation, clustering of the tags.

In S380, if the process is to continue it continues with S310; otherwise, execution terminates.

Figure 4:
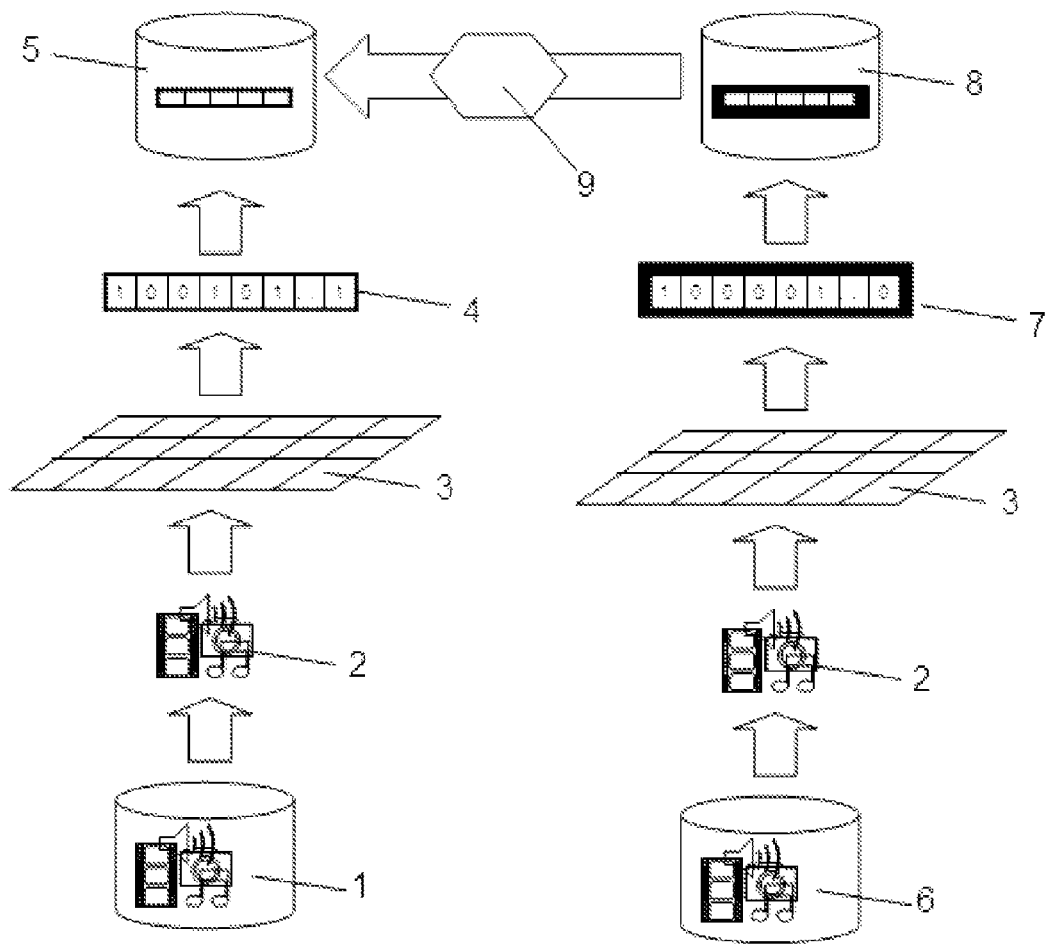
FIG. 4 is a block diagram depicting the basic flow of information in the signature processing system in accordance with an embodiment of the invention.
Figure 5:
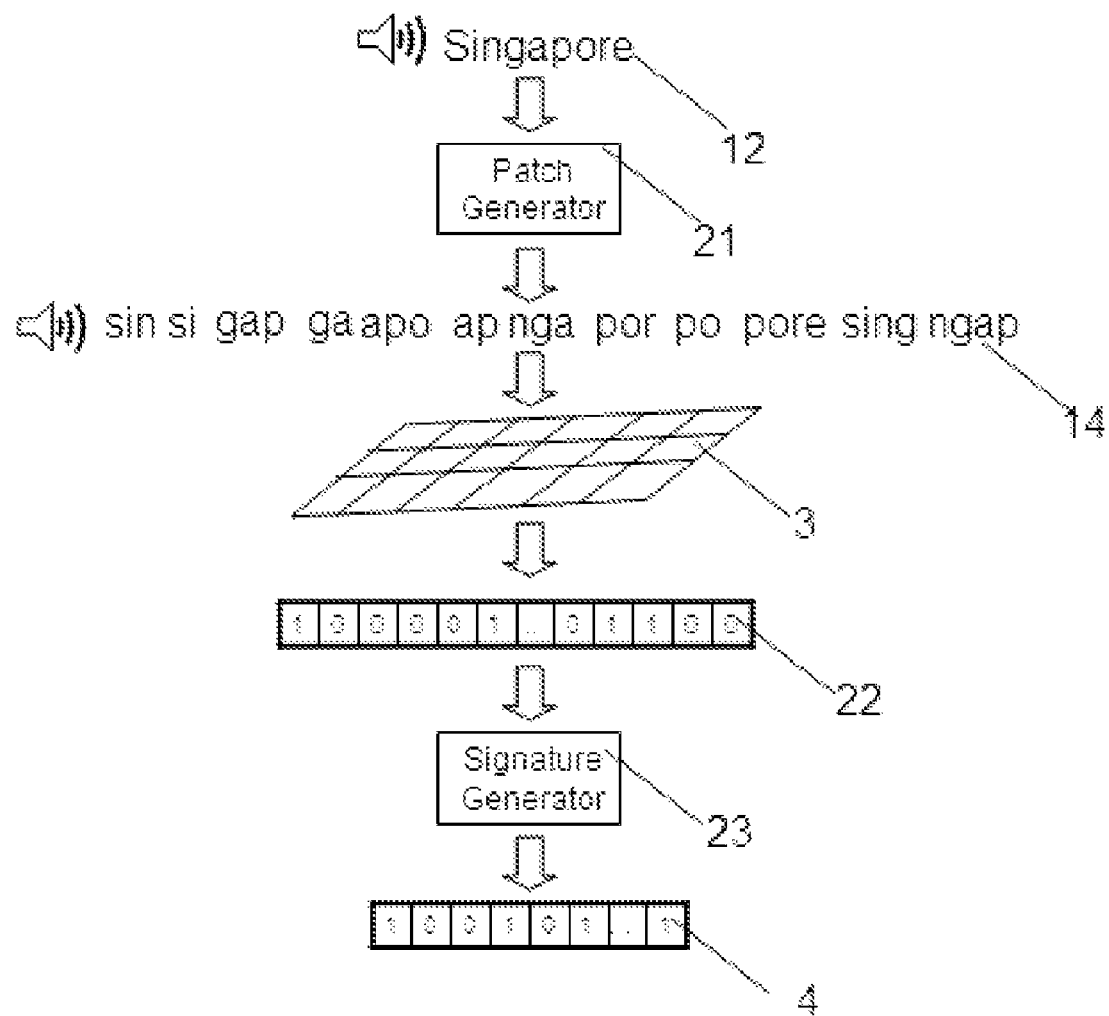
FIG. 5 is a diagram showing the flow of patches generation, response vector generation, and signature generation in a large-scale speech-to-text system implemented in accordance with an embodiment of the invention.

FIGS. 4 and 5 illustrate the generation of Signatures by the SGS 150 in accordance with an embodiment of the invention. A high-level description of the process for large scale video matching performed by the Matching System is depicted in FIG. 4. Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 5. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the invention, that the signatures are based on a single frame, leading to certain simplification of the computational cores generation. The Matching System is extensible for signatures generation capturing the dynamics in-between the frames.

The Signatures' generation process will be described with reference to FIG. 5. The first step in the process of signatures generation from a given speech-segment is to breakdown the speech-segment to K patches 14 of random length P and random position within the speech segment 12. The breakdown is performed by the patch generator component 21. The value of K and the other two parameters are determined based on optimization, considering the tradeoff between accuracy rate and the number of fast matches required in the flow process of the System. In the next step, all the K patches are injected in parallel to all computational Cores 3 to generate K response vectors 22 are fed in to a Signature generator 23 to produce a database of Robust Signatures and Signatures 4.

In order to generate Robust Signatures, i.e., Signatures that are robust to additive noise L (where L is an integer equal to or greater than 1) computational Cores 3 are utilized in the Matching System. A frame i is injected into all the Cores 3. The Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$n_i = \Box(V_i - Th_s)$; $\Box$ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values Thx are set differently for Signature generation and for Robust Signature generation. For example, for a certain distribution of Vi values (for the set of nodes), the thresholds for Signature (ThS) and Robust Signature (ThRS) are set apart, after optimization, according to at least one or more of the following criteria:

1: For: $V_i > Th_{RS}$ $$1 - p(V^\Box > Th_S) = 1(-1-\epsilon)^l << 1$$

i.e., given that l nodes (cores) constitute a Robust Signature of a certain image l, the probability that not all of these l nodes will belong to the Signature of same, but noisy image, Ĩ is sufficiently low (according to a system's specified accuracy).

2: $p(V_i > Th_{RS}) \approx l/L$ i.e., approximately l out of the total L nodes can be found to generate Robust Signature according to the above definition.

3: Both Robust Signature and Signature are generated for certain frame i.

It should be understood that the generation of a signature is a unidirectional, and typically yields lossless compression, where the characteristics of the compressed data are maintained but the uncompressed data cannot be reconstructed. Therefore, a signature can be used for the purpose of comparison to another signature without the need of comparison of the original data. The detailed description of the Signature generation is discussed in more detail in the co-pending patent applications of which this patent application is a continuation-in-part of, and are hereby incorporated by reference.

Computational Core generation is a process of definition, selection and tuning of the Architecture parameters for a certain realization in a specific system and application. The process is based on several design considerations, such as:

(a) The Cores should be designed so as to obtain maximal independence, i.e. the projection from a signal space should generate a maximal pair-wise distance between any two cores' projections into a high-dimensional space.

(b) The Cores should be optimally designed for the type of signals, i.e. the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to set of signal distortions, of interest in relevant application.

According to some embodiments, a user channel may be limited to a particular media, such as video data, or it may integrate various media types. In some embodiments a user channel may be generic or very specific. For example, a user may initiate a channel on a generic theme, e.g., a book. Subsequently the user may drill down and focus the channel on a specific character, theme, location etc. Additional channels may be launched based on similar or different content. According to some embodiments channels may be personalized, such that besides the individualized content, a user may define a channel look, feel, name, description, etc. The user may subsequently distribute the channel to other users, either for commercial or non commercial purposes.

According to some embodiments a user may use multimedia hyperlinking to develop, initiate or manage channels. For example, a user may read, listen to or view certain content, and may want to build a channel around that content, or integrate the content into an existing channel. In such a case, the user may highlight, select or otherwise capture the content, which may then be incorporated as part of the multimedia content viewing in, for example, viewing area 210.

According to some embodiments, channels may be configured in a database and/or a directory, such that users can search or navigate, using the client application and/or a Website, to find channels. In some embodiments a user may find a channel, and subsequently initiate a child-channel, sibling channel or other channels connected to the parent channel. In some embodiments a user may select to make his/her channel open to the public, while in other cases the channel may be private or available for invited users only. In some embodiments the channel owner or manager may control access to the channel, for example, controlling who can access the channel, demand a payment for usage of the channel, determining how to distribute the channel etc.

While a system for creation of automatically generated a personalized multimedia channel has been shown with respect of generation of Signatures the scope of the invention should not be limited to such systems. Specifically system for generation of a personalized multimedia channels by comparison means that do not use Signatures but, for example and without limitations, cluster multimedia content based on metadata associated with the multimedia content. Selection of the personalized multimedia content for a particular channel may be done based on metadata that was associated with previously user used or approved multimedia content. The new multimedia content presented in the channel will have metadata that is within the cluster that fits the user's preferences. Specifically, if a multimedia content has tags, then in accordance with the invention the tags may be clustered based on the preferences exhibited by the user and subsequently additional multimedia content fitting the user's preferences will be added to the channel.

The principles of the invention are implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for generating personalized channels of multimedia content, comprising:
    initializing one or more personalized multimedia content channels of a user with multimedia content, wherein the multimedia content in the one or more personalized multimedia content channel is presented to the user on at least a web-browser of a computing device;
    receiving preferences of the user regarding the preferred multimedia content in the personalized multimedia content channels;
    changing the multimedia content in the one or more personalized multimedia content channels based on the received preferences by:
        searching for new multimedia content based on the preferences of the user;
        adding the new multimedia content channel to the one or more personalized multimedia content channels; and
        removing multimedia content from the one or more personalized multimedia content channels based on the preferences of the user.

2. The method of claim 1, wherein the multimedia content is at least one of:
    an image, graphics, a video stream, a video clip, an audio stream, an audio clip, a video frame, a photograph, images of signals, combinations thereof, and portions thereof.

3. The method of claim 1, wherein each element of the multimedia content has at least a signature.

4. The method of claim 3, wherein the signature is a unidirectional lossless compression of the multimedia content element.

5. The method of claim 3, further comprising:
    clustering of multimedia content in accordance with the signatures of each of the multimedia content element.

6. The method of claim 5, wherein a personalized multimedia channel comprises a cluster generated by the clustering of multimedia content element.

7. The method of claim 6, wherein generating the signature further comprising:
    generating a first signature related to the multimedia content not having a respective signature, the first signature is determined according to a first threshold value, the first signature being robust to at least one of noise and distortion; and
    generating a second signature responsive of the input signal, wherein the second signature is determined respective of a second threshold value which is lower than the first threshold value, the second signature being a non-robust signature.

8. The method of claim 3, further comprising:
    generating a signature respective of multimedia content to multimedia content not having a respective signature.

9. The method of claim 3, further comprising:
    comparing a signature of the preferred multimedia content to at least a signature of a second multimedia content; and
    clustering the second multimedia content to the new multimedia content if a match is found between at least the signature of the preferred multimedia content and the signature of the second multimedia content.

10. The method of claim 3, further comprising:
    clustering of a plurality of multimedia content based on at least signatures respective of each of the plurality of multimedia content.

11. A method for generating personalized channels of multimedia content, comprising:
    initializing one or more personalized multimedia content channels of a user with multimedia content, wherein the multimedia content in the one or more personalized multimedia content channel is presented to the user on at least a web-browser of a computing device;
    receiving preferences of the user regarding the preferred multimedia content in the personalized multimedia content channels;
    gathering multimedia content based on tags associated with the multimedia content into the one or more personalized multimedia content channels;
    changing the multimedia content in the one or more personalized multimedia content channels based on the received preferences.

12. The method of claim 11, further comprising:
    clustering of the tags associated with the multimedia content based on the preferences.

13. The method of claim 12, wherein the new multimedia content has tags that belong to clusters of the clustering of tags.

* * * * *